(12) United States Patent
Lebrun et al.

(10) Patent No.: US 10,817,998 B1
(45) Date of Patent: Oct. 27, 2020

(54) SYSTEMS AND METHODS FOR SELECTING IMAGES

(71) Applicant: GoPro, Inc., San Mateo, CA (US)

(72) Inventors: Marc Lebrun, Issy-les-Moulineaux (FR); Eva Coupeté, San Mateo, CA (US); Benjamin Carpentier, San Mateo, CA (US)

(73) Assignee: Go Pro, Inc., San Mateo, CA (US)

( * ) Notice: Subject to any disclaimer, the term of this patent is extended or adjusted under 35 U.S.C. 154(b) by 78 days.

(21) Appl. No.: 16/233,870

(22) Filed: Dec. 27, 2018

(51) Int. Cl.
| | | |
|---|---|---|
| *G06T 7/00* | (2017.01) | |
| *G06T 7/90* | (2017.01) | |
| *G06K 9/00* | (2006.01) | |
| *H04N 9/67* | (2006.01) | |

(52) U.S. Cl.
CPC ........ *G06T 7/0002* (2013.01); *G06K 9/00758* (2013.01); *G06T 7/90* (2017.01); *H04N 9/67* (2013.01); *G06T 2207/10016* (2013.01); *G06T 2207/10024* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 2008/0019661 A1* | 1/2008 | Obrador | H04N 5/144 386/210 |
| 2008/0019669 A1* | 1/2008 | Girshick | G06F 16/739 386/224 |

FOREIGN PATENT DOCUMENTS

WO    WO-2018203920 A1 * 11/2018 ......... G06K 9/00751

\* cited by examiner

*Primary Examiner* — Delomia L Gilliard
(74) *Attorney, Agent, or Firm* — Esplin & Associates, PC

(57) ABSTRACT

A video may include multiple video frames. The video frames may be scored based on values of multiple content metrics for individual frames. One or more portions of the video that includes a threshold number of consecutive video frames that meet a score threshold may be identified. For individual ones of the identified portion(s), a video frame may be selected based on a maximum of the score for presentation as an exemplar image.

20 Claims, 10 Drawing Sheets raw thumbnail 302 modified thumbnail 304 video frame 402

Top Band

Middle Band

Bottom Band video frame 404

Top Band

Middle Band

Bottom Band video frame 502 video frame 504 video frame 602 video frame 604

SYSTEMS AND METHODS FOR SELECTING IMAGES

FIELD

This disclosure relates to selecting an image from a set of images as an exemplar image.

BACKGROUND

A user may capture images as video frames of a video. Manually reviewing the images to score the images may be time consuming. For example, manually reviewing video frames of a video to determine which of the video frames are most/more visually pleasing may be time consuming.

SUMMARY

This disclosure relates to selecting images. Video information defining a video and/or other information may be obtained. The video may include video content having a progress length. The video content may include video frames that define visual content viewable as a function of progress through the progress length. Values of multiple content metrics may be determined for individual video frames based on analysis of the individual video frames. A score for the individual video frames may be determined based on the values of the multiple content metrics of the individual video frames. The score of the individual video frames as a function of progress through the progress length may form a score line. One or more portions of the video content including a threshold number of consecutive video frames that meet a score threshold may be identified. For individual ones of the portion(s) of the video content, a video frame may be selected as an exemplar image based on a maximum of the score line within the individual ones of the portion(s) of the video content. One or more selected video frames may be presented on a display.

A system that selects images may include one or more electronic storage, processor and/or other components. The electronic storage may store video information defining videos, information relating to videos, information relating to content metrics, information relating to values of content metrics, information relating to scores for video frames, information relating to identification of video portions, information relating to selected video frames, information relating to exemplar images, and/or other information.

The processor(s) may be configured by machine-readable instructions.

Executing the machine-readable instructions may cause the processor(s) to facilitate selecting images. The machine-readable instructions may include one or more computer program components. The computer program components may include one or more of a video information component, a metric component, a score component, an identification component, a selection component, a presentation component, and/or other computer program components.

The video information component may be configured to obtain video information defining a video and/or other information. The video may include video content having a progress length. The video content may include video frames that define visual content viewable as a function of progress through the progress length. The video information component may obtain video information from one or more storage locations. The video information component may obtain video information during acquisition of the video and/or after acquisition of the video by one or more image capture devices.

The metric component may be configured to determine values of multiple content metrics for individual video frames based on analysis of the individual video frames and/or other information. In some implementations, lower-resolution thumbnails of the video frames may be generated for determination of the values of the multiple content metrics. For example, 64×48 thumbnails of the video frames may be generated for analysis to determine the values of the multiple content metrics. In some implementations, the lower-resolution thumbnails may include RGB thumbnails and/or other thumbnails. A color space transform may be performed on the RGB thumbnails to obtain HSV thumbnails.

In some implementations, the multiple content metrics may include two or more of a three-bands metric, a contrast metric, a uniformity metric, and/or other metric. The three-bands metric may characterize division of the visual content within a first band, a second band, and a third band. The second band may be located between the first band and the third band. The contrast metric may characterize a range of colors within the visual content. The uniformity metric may characterize uniformity of the visual content.

In some implementations, the multiple content metrics may include a sharpness metric. The sharpness metric may characterize sharpness of the visual content The score component may be configured to determine a score for the individual video frames based on the values of the multiple content metrics of the individual video frames and/or other information. The score as a function of progress through the progress length may form a score line. For example, the score line may include a curve, with the values of the curve corresponding to the values of the multiple content metrics of the individual video frames.

In some implementations, the score for the individual video frames may be determined based on combination of the values of the multiple content metrics along a common progress line and/or other information. The common progress line may be selected based on frequencies of the values of the multiple content metrics and/or other information.

The identification component may be configured to identify one or more portions of the video content including a threshold number of consecutive video frames that meet a score threshold and/or other information.

The selection component may be configured to, for individual ones of the one or more portions of the video content, select one or more video frames as one or more exemplar images based on a maximum of the score line within the individual ones of the one or more portions of the video content and/or other information. In some implementations, a video frame may be selected as an exemplar image based on sharpness of the visual content defined by the video frame and the video frame being within a threshold number of frames from the maximum of the score line.

In some implementations, at least one of the one or more selected video frames may be filtered out as a similar video frame based on similarity to another selected video frame retained as a retained video frame. The similar video frame may be filtered out further based on depiction of one or more objects within the similar video frame and the retained video frame and/or other information.

The presentation component may be configured to present one or more selected video frames on one or more displays. In some implementations, the selected video frame(s) may be presented as exemplar image(s) of the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
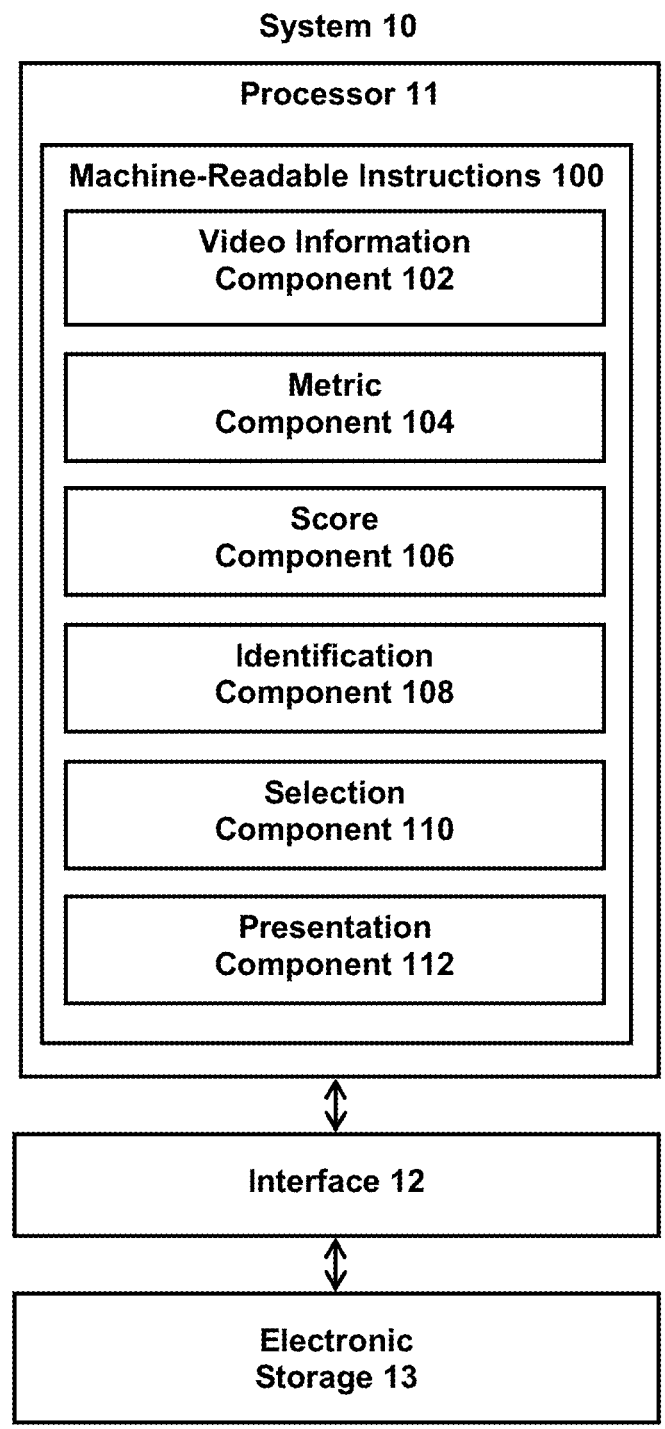
FIG. 1 illustrates a system that selects images.

FIG. 1 illustrates a system 10 for selecting images. The system 10 may include one or more of a processor 11, an interface 12 (e.g., bus, connection, wireless interface), an electronic storage 13, and/or other components. Video information defining a video and/or other information may be obtained by the processor 11. The video may include video content having a progress length. The video content may include video frames that define visual content viewable as a function of progress through the progress length. Values of multiple content metrics may be determined for individual video frames based on analysis of the individual video frames. A score for the individual video frames may be determined based on the values of the multiple content metrics of the individual video frames. The score of the individual video frames as a function of progress through the progress length may form a score line. One or more portions of the video content including a threshold number of consecutive video frames that meet a score threshold may be identified. For individual ones of the portion(s) of the video content, a video frame may be selected as an exemplar image based on a maximum of the score line within the individual ones of the portion(s) of the video content. One or more selected video frames may be presented on a display.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining videos, information relating to videos, information relating to content metrics, information relating to values of content metrics, information relating to scores for video frames, information relating to identification of video portions, information relating to selected video frames, information relating to exemplar images, and/or other information.

A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of one or more images and/or one or more videos that may be consumed visually. For example, visual content may be included within one or more image and/or one or more video frames of a video. The video frame(s) may define the visual content of the video content. That is, video content may include video frame(s) that define the visual content of the video content. Video frame(s) may define visual content viewable as a function of progress through the progress length of the video content. A video frame may include an image of the video content at a moment within the progress length of the video content. Visual content may be generated based on light received within a field of view of a single image sensor or within fields of view of multiple image sensors during a capture period.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate selecting images. The machine-readable instructions 100 may include one or more computer program components. The machine-readable instructions 100 may include one or more of a video information component 102, a metric component 104, a score component 106, an identification component 108, a selection component 110, a presentation component 112, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining a video during acquisition of the video and/or after acquisition of the video by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information may be obtained based on user interaction with a user interface/application (e.g., video editing application), and/or other information. For example, a user interface/application may provide option(s) for a user to select one or more videos which are image(s) (e.g., exemplary image(s)) are to be selected and/or presented. The video information defining the video(s) may be obtained based on the user's selection of the video(s) through the user interface/video application. As another example, a user interface/application may provide option(s) for a user to select a capture mode in which best images are selected. During capture of images (e.g., video frames, sequence of images), the video information defining the images may be obtained.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

Video information may define one or more videos (e.g., non-spherical video, spherical video, panoramic video). A video defined by video information may include video content having a progress length. The video content may include video frames that define visual content viewable as a function of progress through the progress length. In some implementations, video information may define images capture during a progress length. The images may define visual content viewable as a function of progress through the progress length (e.g., different images define different visual content). While the disclosure herein is described in reference to video frames, this is merely for ease of reference and is not meant to be limiting. The approaches described herein may be applied to images (video frames) captured as part of a video, images captured as a part of a sequence of images, images captured separately, and/or other images.

A video frame may include visual content. A video frame may include an image. The visual content may include pixels with colors defined by values of multiple channels. A pixel may represent a unit of a video frame that may be displayed and/or represented. Arrangement of pixels may form the visual content of the video frame. Individual pixels may be defined by values of one or more channels. A channel may store color information for one color component of a color space (color model, color system). For example, the visual content of a video frame may include pixels with colors defined by values of one or more of a red channel, a green channel, a blue channel (RGB color space), and/or other channels. The visual content of a video frame may include pixels with colors defined by values of one or more of a hue channel, a saturation channel, a value channel (HSV color space), and/or other channels. Use of other channels and/or color spaces are contemplated.

In some implementations, analysis of a video frame may be performed on a lower-resolution thumbnail of the video frame. Analysis of a video frame may include one or more uses of the video frame for determine values of content metrics and/or selecting the video frame. A thumbnail of a video frame may refer to a smaller image that represents the video frame. For example, a video frame may have a resolution of 4000 pixels by 3000 pixels (4000×3000), and the analysis of the video frame may be performed on a lower-resolution thumbnail of the video frame having a resolution of 64 pixels by 48 pixels (64×48). Other aspect ratios of the video frame and other scaling down of the video frame for the thumbnail are contemplated.

For example, lower-resolution thumbnails of the video frames may be generated and used for determining values of one or more content metrics and/or other analysis of the video frames. For instance, 64×48 thumbnails of video frames may be generated for analysis to determine the values of multiple content metrics.

Use of lower-resolution thumbnails for video frame analysis may reduce the processing cost of the video frame analysis. For example, use of lower-resolution thumbnails for video frame analysis may reduce processing time, processing power, power/battery charge consumption, memory usage, and/or other processing cost of the video frame analysis.

In some implementations, one or more color space conversion may be applied to the video frame for analysis of the video frame. In some implementations, the lower-resolution thumbnails may include RGB thumbnails and/or other thumbnails, and a color space transform may be performed on the RGB thumbnails to obtain HSV thumbnails. For example, RGB video frame/thumbnail may be obtained and a RGB to HSV color space conversion may be performed to determine values of one or more content metrics. In some implementations, the hue of the HSV color space may be 360-cyclical and a 1-cyclical hue may be used for the analysis of the video frame. Other color space conversions are contemplated.

In some implementations, one or more of an auto white balance, a color matrix, a tone curve, a gamma correction, and/or a GTM look-up-table be applied to the lower-resolution thumbnail to accentuate color discrimination within the lower-resolution thumbnail. One or more preprocessing steps may be performed to interpolate the thumbnails, the auto white balance, the color matrix, the tone curve, the gamma correction, and/or the GTM look-up-table to a common line.

Figure 3:
FIG. 3 illustrates examples of a raw thumbnail and a modified thumbnail.
Figure 3:
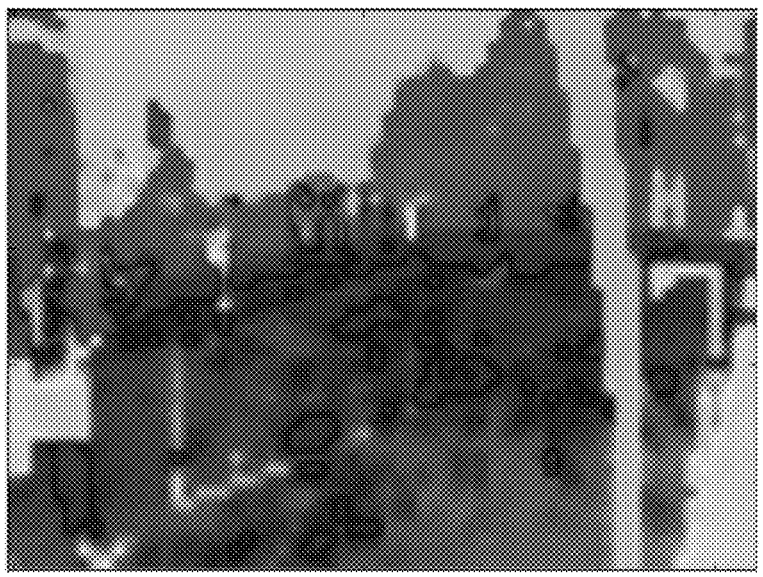

For example, a thumbnail of a video frame may be dark and it may be difficult to discriminate the colors over the reduced resolution (e.g., 64×48). Application of the auto white balance, the color matrix, the tone curve, the gamma correction, and/or the GTM look-up-table may increase the distinction between the colors in the thumbnails and facilitate analysis of the video frames/thumbnails. For example, increasing the distinction between the lowers in the thumbnails may allow for better differentiation between the sky, the ground, and object(s) between the ground and the sky within the video frames/thumbnails. FIG. 3 illustrates examples of a raw thumbnail 302 and a modified thumbnail 304. The modified thumbnail 304 may be generated via application of the auto white balance, the color matrix, the tone curve, the gamma correction, and/or the GTM look-up-table to the raw thumbnail 302.

In some implementations, video frame analysis may be performed using existing data for the video frame. For example, values of one or more content metrics may be determined using an RGB thumbnail provided by an auto white balance block of an image capture device.

The metric component 104 may be configured to determine values of one or more content metrics for individual video frames based on analysis of the individual video frames and/or other information. The value(s) of the content metric(s) may be determined during capture of the video/video frames and/or after the capture of the video/video frames. A content metric may refer to a one or more standards, systems, and/or factors for measuring content of a video frame. A content metric may measure content of a video frame based on pixel characteristics of the video frame. A pixel characteristic may refer to one or more of feature, quality, quantity, trait, property, value, measurable factor, and/or other information relating to a pixel, such as a color, contrast, brightness, and/or other characteristic of a pixel. A content metric may determine how the pixel characteristics of the video frame are used to determine the value of the content metric.

For example, the metric component 104 may be configured to determine values of multiple content metrics for individual video frames of a video based on analysis of the individual video frames and/or other information. The multiple content metrics may include two or more different content metrics—two or more different standards, systems, and/or factors for measuring content of a video frame. For example, the multiple content metrics used by the metric component 104 may include two or more of a three-bands metric, a contrast metric, a uniformity metric, and/or other metric.

The three-bands metric may refer to a metric that measures the content of a video frame based on a division of visual content of the video frame within three bands. A band may refer to a portion of the image. For example, a band of an image may refer to a strip (e.g., one or more columns, one or more rows) of pixels within the image. A three-bands metric may characterize the division of the visual content of a video frame within a first band, a second band, and a third band, with the second band located between the first band and the third band. The three bands may be used to determining framing of the visual content within the video frame, such as to what extent the video frame includes a depiction of the sky within a first band (top band), a depiction of a one or more objects between the sky and the ground within the second band (middle band), and a depiction of the ground within the third band (bottom band).

Figure 4A:
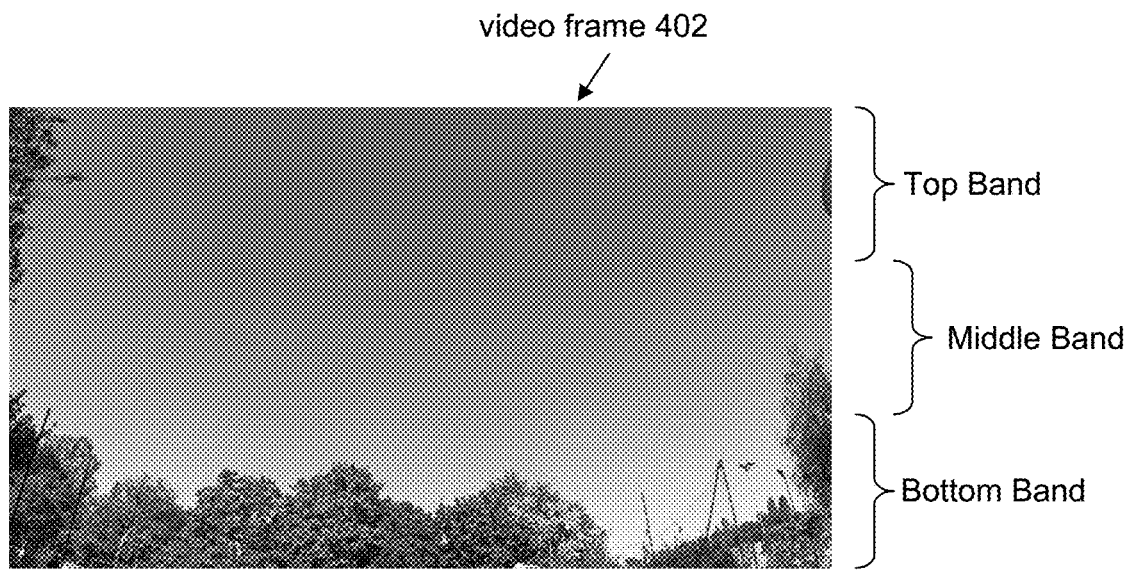
FIG. 4A illustrates example images evaluated using a three-bands metric.
Figure 4A:
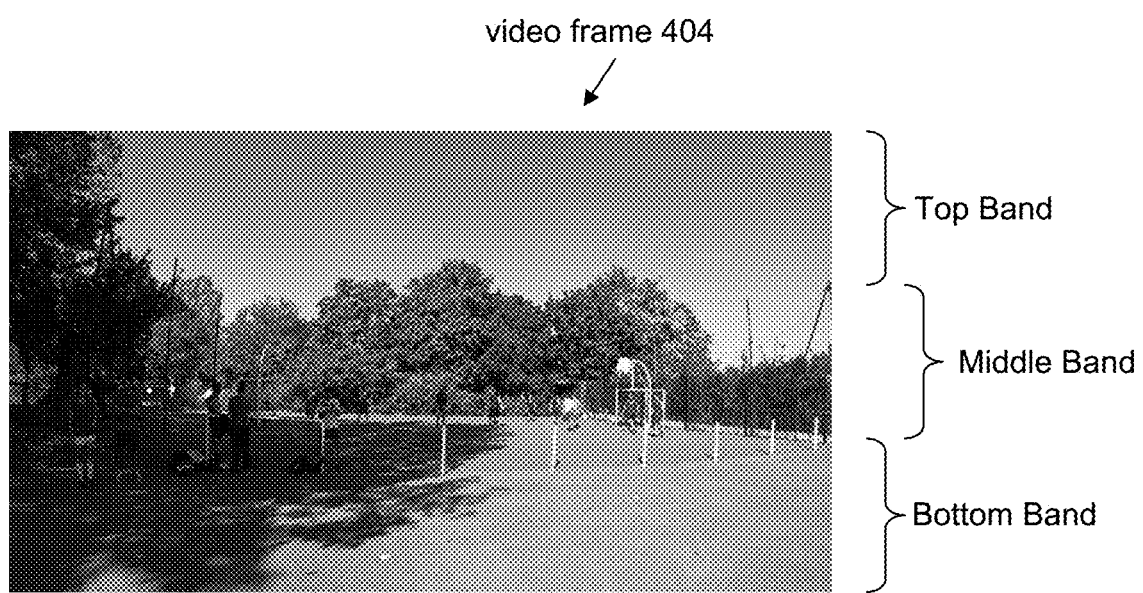

For example, FIG. 4A illustrates example video frames 402, 404 evaluated using a three-bands metric. The video frame 402 may mostly include a depiction of sky within the top band and the middle band, and include a depiction of sky and trees within the bottom band. The video frame 404 may include a depiction of the sky and a little portion of a tree within the top band, include a depiction of trees, persons, and other objects within the middle band, and mostly include a depiction of the ground within the bottom band. The evaluation of the video frames 402, 404 using the three-bands metric may result in different values of the three-bands metric being determined for the video frames 402, 404. For example, the value of the three-bands metric for the video frame 402 may be lower than the value of the three-bands metric for the video frame 404 (or vice versa), and indicate that the video frame 404 has a better framing of visual content than the video frame 402.

Determination of the value of the three-bands metric for a video frame may include segmenting the video frame into bands. The segmentation of the video frame into bands may enable evaluation of the video frame based on color characteristics of the pixels within individual bands. The video frame may be segmented into bands of same shape and/or size, or into bands of different shapes and/or sizes. Segmenting the video frame into bands may include one or more of analyzing different portions of the video frame as the bands within the video frame, determining the bands within the video frame, dividing the video frame into the bands, extracting different portions of the video frame as the bands within the video frame, identifying the bands within the video frame, locating the bands within the video frame, setting the bands within the video frame, and/or otherwise segmenting the video frame into bands. The bands may be organized in a top-down manner (e.g., top, middle, bottom as shown in FIG. 4A), in a side-to-side manner, or in other ways. For example, analysis of the video frames 402, 404 using top-down bands may account for the depiction of things below the horizon (e.g., the ground), the depiction of things above the horizon (e.g., the sky), and the depiction of things on or near the horizon (e.g., object(s) between the ground and the sky).

The value of the three-bands metric may be determined based on values of one or more channels of pixels within the individual bands and/or other information. For example, a set of color metric values may be determined for the individual bands based on the values of multiple channels of pixels within the individual bands. A set of color metric values may include one or more color metric values. A color metric value may refer to a value determined (e.g., calculated) based on one or more color characteristics of the pixels within the individual bands. Multiple color metric values may be determined based on multiple color metrics. A color metric may refer to a one or more standards, systems, and/or factors for measuring pixel characteristics for a color. A color metric may be used to characterize one or more color characteristics of the pixels within the individual bands. The color characteristics of the pixels may be included within multiple channels, and the color metrics may be used to characterize multiple color characteristics of the pixels in multiple channels.

For example, the channels by which colors of pixels are defined may include one or more of a hue channel, a saturation channel, a value channel, a red channel, a green channel, a blue channel, and/or other channels, and the color metrics by which a set of color metric values are determined may include color metrics that characterize color characteristics of pixels within one or more of the hue channel (hue metric), the saturation channel (saturation metric), the value channel (value metric), the red channel (red metric), the green channel (green metric), the blue channel (blue metric), and/or other channels.

A value of a color metric value may equal and/or be determined based on value(s) that define the color of the pixels within the corresponding channel(s). For example, a value of a color metric for a band with respect to the hue channel may be determined as and/or based on the values of the hue of pixels within the band, such as based on mean of hue, trimmed mean of hue, sigma mean of hue, and/or median of hue. Mean of hue may refer to the average of hue values of the pixels within the band. Trimmed mean of hue may refer to mean values calculated with removal of a certain amount of the lowest and highest hue values (e.g., removal of lowest 10% and highest 10% hue value). Same or different amounts may be removed from the two ends. Trimmed mean of hue may be determined by discarding a certain amount of the lowest and highest hue values before calculation of the mean value. The trimmed mean of hue may not be directly calculated from the hue channel. For example, RGB means may be computed on RGB thumbnails, and the hue and saturation mean values may be calculated from the RGB means. Sigma mean of hue may refer to mean values calculated using standard deviation of the hue values (e.g., mean with +/−3*sigma of hue). Median of hue may refer to the median hue values of the pixels within the band.

The use of one or more of the trimmed mean of hue, sigma mean of hue, and/or median of hue may enable calculation of the color metric values that avoid outliers in the computation of the hue (e.g., colorful objects within the video frame that modifies the dominant hue may be discarded). The use of one or more of the trimmed mean of hue, sigma mean of hue, and/or median of hue may smooth the color metric value generation. The same or similar metrics may be applied to other channels (e.g., saturation channel, value channel, red channel, green channel, blue channel) for color metric value generation.

In some implementations, a color metric value may be determined using a standard deviation. For example, a color metric value for the hue channel and/or the saturation channel may include a standard deviation value of the corresponding hue/saturation values of pixels within a band.

A hue channel may be circular (e.g., for normalized hue, 0.01 hue value may be similar to 0.99 hue value) and classic mean and standard deviation computation may not be used. The determination (calculation) of the color metric value for the hue channel may be performed using circular mean and circular standard deviation. For circular mean, $h_k$ may denote the hue values over the flattened video frame/thumbnail, with vector size height×weight. These values may be normalized in [0, 1]. Radian values may be obtained by multiplying by $2\pi$, and then computing the mean (M):

$$M = \arctan2\left(\sum_k \sin(h_k), \sum_k \cos(h_k)\right)$$

The mean (M) may be normalized to [0, 1] (divided by $2\pi$). To ensure that the mean value exists in [0, 1], a value of 1.0 may be added to the mean if the mean is below zero (because it is a circular value). Circular standard deviation may be calculated over the radian values:

$$\sqrt{-\log\left(\left(\frac{\sum_k \sin(h_k)}{H \times W}\right)^2 + \left(\frac{\sum_k \cos(h_k)}{H \times W}\right)^2\right)}$$

In some implementations, hue and/or saturation values may be calculated from RGB values. For example, hue and/or saturation mean values may be calculated from RGB mean values. Trimming of values before mean calculation may allow for removal of outlier values within bands/video frames. However, because hue value may be circular, it may be more difficult to discriminate the outlier values. Thus, rather than directly calculating trimmed mean of hue and/or saturation, trimmed mean of one or more of RGB channels may be calculated, and the trimmed mean of hue and/or saturation may be calculated from the RGB trimmed mean.

A ratio of one or more values of a set of color metric values of one band to one or more values of another set of color metric values of another band may be determined. For example, referring to FIG. 4A, a ratio of one or more values of the set of color metric values of a middle band to one or more values of the set of color metric values of the top band may be determined. A ratio of one or more values of the set of color metric values of the middle band to one or more values of the set of color metric values of the bottom band may be determined. Determination of other ratios are contemplated.

In some implementations, the ratio of the value(s) of different sets of color metric values may be determined as a minimum of different ratios of the standard deviation of color metric value(s). For example, referring to FIG. 4A, the ratio may be determined as a minimum of (1) a first ratio of a standard deviation of one or more value of the set of color metric values of the middle band to one or more value of the set of color metric values of the top band, and (2) a second ratio of a standard deviation of one or more values of the set of color metric values of the middle band to one or more values of the set of color metric values of the top band.

For example, the ratio may use both hue and saturation channels, and select the more discriminating ratio. For instance, if colors are similar, then saturation may be used to favor high color contrast. For example, the ratio may be computed as following, with "top" corresponding to values of a top band, "mid" corresponding to values of a middle band, "bot" corresponding to values of a bottom band, and a representing the standard deviation of the corresponding channel and band:

$$r = \min\left(\sqrt{\frac{\sigma_{mid}^{hue}\sigma_{mid}^{sat}}{\sigma_{top}^{hue}\sigma_{top}^{sat}}}, \sqrt{\frac{\sigma_{mid}^{hue}\sigma_{mid}^{sat}}{\sigma_{bot}^{hue}\sigma_{bot}^{sat}}}\right)$$

To normalize the values, the ratio (r) may be stretched between two thresholds:

$$r = \frac{\min(\max(r, \tau_{min}), \tau_{max}) - \tau_{min}}{\tau_{max} - \tau_{min}}$$

A value of the three-bands metric for a video frame may be determined based on the ratio, one or more comparisons of value(s) of a set of color metric values of one band to value(s) of one or more sets of color metric values of other band(s). For example, referring to FIG. 4A, a value of the three-bands metric for the video frame 404 may be determined based on the ratio of color metric value(s), the comparison of color metric value(s) of the top band to the bottom band, and the comparison of color metric value(s) of the middle band to the top or bottom band, and/or other information.

Figure 4B:
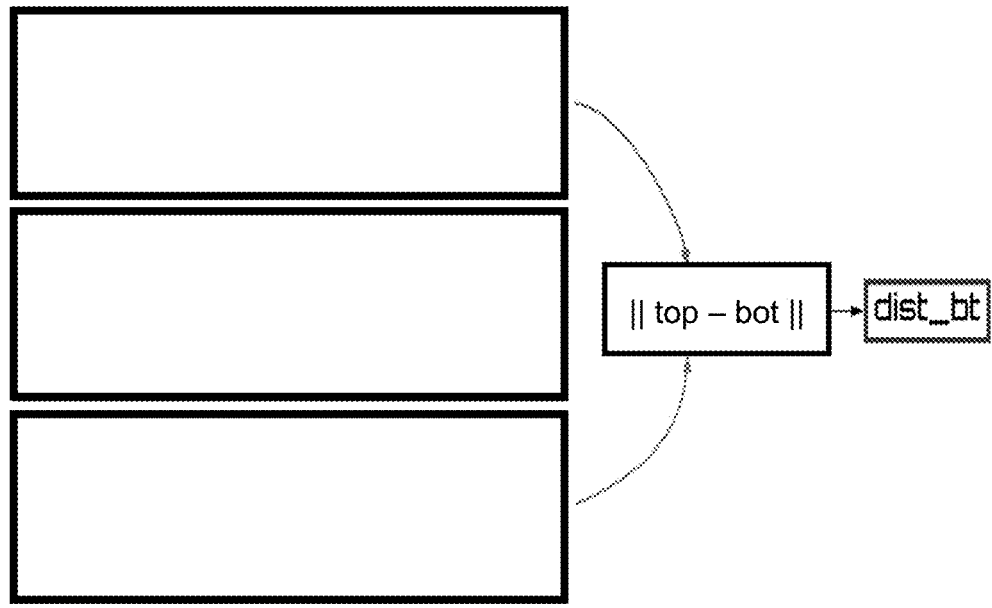
FIG. 4B illustrates example comparison of color metric values for a three-bands metric.
Figure 4B:
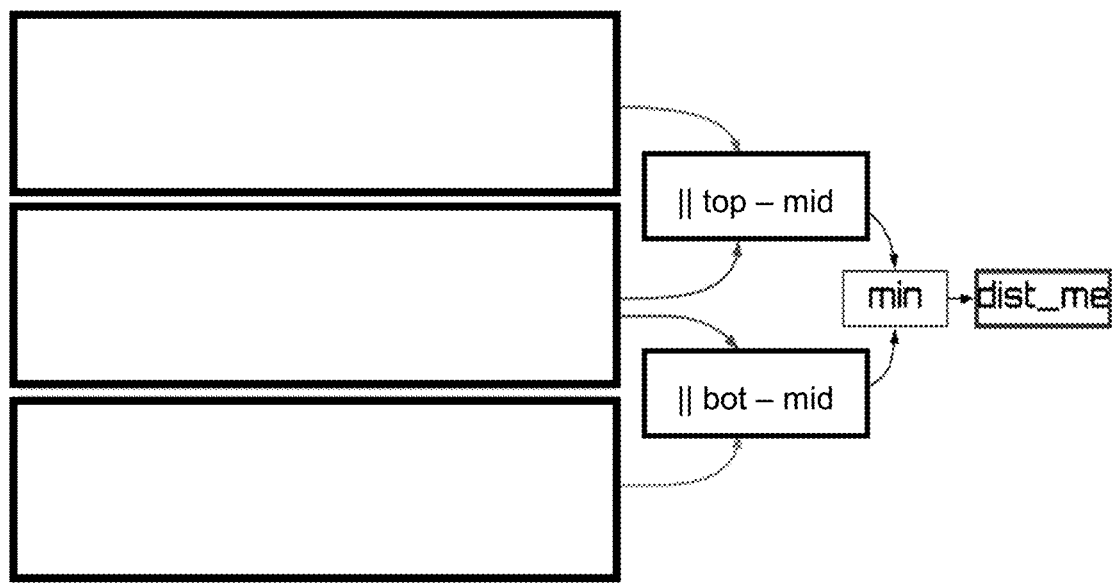

The comparisons may be used to determine the differences in color metric value(s) (distances) between the bands. The distance between the top and bottom bands may be denoted as $\delta_{bt}$ or dist_bt and the distance between the middle band and the top/bottom band may be denoted as $\delta_{me}$ or dist_me. For example, the distance between the top and bottom bands (dist_bt) may be calculated as shown in top of FIG. 4B, and the distance between the middle band and the top/bottom band (dist_me) may be calculated as shown in bottom of FIG. 4B, as minimum of (1) the distance between the middle and top bands and (2) the distance between the middle and bottom bands. Example calculation of distances are provided below. Other distance calculations are contemplated.

The distance between the middle band and the top/bottom band (dist_me) may be reinforced by the saturation contrast. The saturation contrast ($\omega_{me}$) may be the distance in saturation channel, given by the following, where p is a color metric value (e.g., mean, trimmed mean, sigma mean, median) of the corresponding channel and band:

$$\omega_{me} = \min(\|\mu_{top}^{sat} - \mu_{mid}^{sat}\|_1, \|\mu_{mid}^{sat} - \mu_{bot}^{sat}\|_1)$$

The distance between the top and bottom bands ($\delta_{bt}$, dist_bt) may be calculated as the following, where lie is the circular distance:

$$\delta_{bt} = \max(\|\mu_{top}^{hue} - \mu_{bot}^{hue}\|_c, \|\mu_{top}^{sat} - \mu_{bot}^{sat}\|_1)$$

The distance between the middle band and the top/bottom band ($\delta_{me}$, dist_me) may be calculated as the following:

$$\delta_{me} = \max(\min(\|\mu_{top}^{hue} - \mu_{mid}^{hue}\|_c, \|\mu_{mid}^{hue} - \mu_{bot}^{hue}\|_c), \\ \min(\|\mu_{top}^{sat} - \mu_{mid}^{sat}\|_1, \|\mu_{mid}^{sat} - \mu_{bot}^{sat}\|_1))$$

The value of the three-bands metric for the video frame may be determined based on the distances between the bands. For example, the value of the three-bands metric for the video frame may be determined as a linear interpolation between dist_bt and dist_me. Example calculation of the score (S) may include the following:

$$S = 2(r\delta_{bt} + (1-r)\sqrt{\delta_{me}\omega_{me}})$$

To account for circular distances in [0, ½], the value may be multiplied by 2.0 to keep the score within [0, 1]. The ratio (r) may impact the influence of the distances (dist_bt, dist_me) on the value. For example, if the middle band includes depiction of both ground and sky, or has color from one side (e.g., trees in the middle of over grass on the ground), it may be difficult to separate the middle band from the top/bottom band. Therefore, the difference between the top and bottom bands (dist_bt) may have more impact on the value. If the middle band is uniform or is similar to the top/bottom band, the color distances between the middle band and both the top and bottom bands may be calculated. Other value determinations are contemplated.

In some implementations, the value of the three-bands metric may characterize inclusion of a depiction of a sky within the top band, inclusion of a depiction of a ground within the bottom band, and inclusion of a depiction of one or more objects between the ground and the sky within the middle band. For example, the value of the three-bands may depend on the extent to which the top band includes a depiction of a sky, the bottom band includes a depiction of a ground, and the middle band includes a depiction of one or more objects (e.g., persons, animal, plant, vehicle, structure, landscape, horizon) between the ground and the sky. For example, the value of the three-bands metric may be low/minimized if the visual content within the video frame is uniform, and the value of the three-bands metric may be high/maximized if the visual content within the video frame is divided/balanced within three bands (or vice versa).

In some implementations, the value of the three-bands metric may be modified based on a tilt of visual content within the video frame and/or other information. For example, a tilt of visual content within the video frame (e.g., due to video frame being captured with tilted image capture device) may cause the value of the three-bands metric to be higher, and the value of the three-bands metric of the video frame with tiled visual content may be reduced. In some implementations, the video frame may be modified to remove the tilt of visual content. For example, the video frame may be rotated to level a horizontal feature within the video frame (e.g., leveling the depiction of a horizon/horizontal object within the video frame). The video frame may be cropped to provide a view with the same aspect ratio as the original, unrotated video frame.

Figure 5:
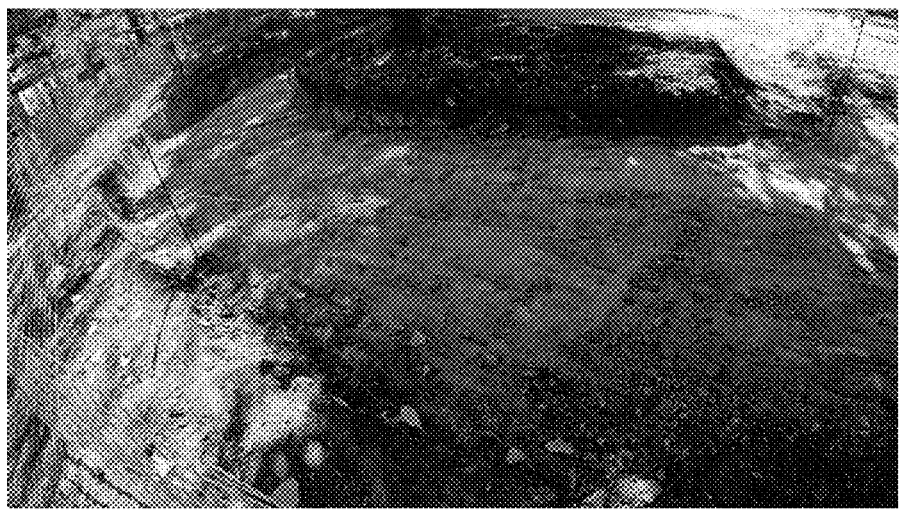
FIG. 5 illustrates example images evaluated using a contrast metric.
Figure 5:

The contrast metric may refer to a metric that measures the content of a video frame based on contrast of visual content of the video frame. The contrast metric may characterize a range of colors within the visual content. The value of the contrast metric may depend on the extent to which the visual content of the video frame includes capture of well contrasted visual content. The value of the contrast metric may be low/minimized if the visual content within the video frame is uniform or poorly exposed, and high/maximized if the visual content within the video frame is well contrasted (e.g., well contrasted in luminance and colors, uses full intensity range, does not favor one particular gray level, have high number/maximum of vivid colors) (or vice versa). For example, referring to FIG. 5, the value of the contrast metric for the video frame 502 may be lower than the value of the contrast metric for the video frame 504 (or vice versa), and indicate that the video frame 504 has a contrast of visual content than the video frame 502.

A value of the contrast metric for a video frame may be determined based on the luminance and color contrast over the video frame, with the value being dependent on intensity ranges of vivid colors. The channels used to determine the value of the contrast metric may include one or more of a red channel, a green channel, a blue channel (RGB color space), a hue channel, a saturation channel, a value channel (HSV color space), in addition to a Y histogram (e.g., 12-bit Y histogram). A well-contrasted video frame may have may have flat luminance and hue histogram, and a high color standard deviation to reflect high dynamic range and vivid colors of the visual content. The value of the contrast metric may be determined based on entropy of luminance and hue channel histogram. In some implementations, the hue histogram may be computed over a thumbnail (e.g., 64×48) while the luminance histogram may be computed over the full frame (e.g., in 12 bits). The value of the contrast metric may be determined further based on standard deviation over the saturation channel, and a circular standard deviation over the hue channel. In some implementations, the value of the contrast metric for a video frame may be determined based data provided by an image capture device (e.g., in a binary dump).

The value of the contrast metric for a video frame may be determined based on luminance disparity, color disparity, color contrast, and/or other pixel characteristics of the video frame. Luminance disparity ($I_d$) may be computed as an entropy of a luminance histogram (e.g., in 12 bits). To compute the luminance disparity ($I_d$), a gamma curve may be applied to the luminance histogram, the precision of the histogram may be changed (e.g., from 12 bits to 8 bits), and the histogram may be normalized. The entropy ($E_h$) may be computed as:

$$E_h = \sum_{n=0}^{2^8-1} (-H(n)\log(H(n)))$$

The computed entropy may be normalized by the maximum achievable entropy ($E_m$), which may be obtained when histogram is flat. For example, when $H(n)=1/256$ for each bin, the maximum achievable entropy ($E_m$) may be computed as:

$$E_m = \sum_{n=0}^{2^8-1} \left(-\frac{1}{2^8}\log\left(\frac{1}{2^8}\right)\right) = 8\log(2) \approx 5.545$$

The minimum achievable entropy ($E_0$) may be empirically set (e.g., $E_0=4.2$). The luminance disparity ($I_d$) may be computed as:

$$I_d = \frac{\max(E_h - E_0, 0)}{E_m - E_0}$$

The color disparity ($c_d$) may be computed over the histogram of the hue channel. To compute the color disparity ($c_d$), the hue channel may be obtained from a video frame (e.g., RGB 64×48 thumbnail). A six-bit precision histogram may be computed over the hue channel and normalized. The entropy ($E_h$) may be computed as:

$$E_h = \sum_{n=0}^{2^8-1} (-H(n)\log(H(n)))$$

The maximum achievable entropy ($E_m$) may be computed as:

$$E_m = \sum_{n=0}^{2^6-1} \left(-\frac{1}{2^6}\log\left(\frac{1}{2^6}\right)\right) = 6\log(2) \approx 4.159$$

The minimum achievable entropy ($E_0$) may be empirically set (e.g., $E_0=2.0$). The color disparity ($c_d$) may be computed as:

$$c_d = \frac{\max(E_h - E_0, 0)}{E_m - E_0}$$

The color contrast ($c_c$) may be computed based on two standard deviations: (1) a classic standard deviation computed over the saturation channel ($\sigma_s$), and (2) a circular standard deviation computed over the hue channel ($\sigma_h$). The circular standard deviation of the hue may lie in [0, ½] and may be multiplied by two to change the range to [0, 1]. The color contrast ($c_c$) may be computed as:

$$c_c = \sqrt{2\sigma_h \sigma_s}$$

Based on the luminance disparity ($I_d$), the color disparity ($c_d$), and the color contrast ($c_c$), the value of the contrast metric for a video frame may be determined. For example, the value of the contrast metric for a video frame may be determined as:

$$\frac{\sqrt{I_d c_d} + c_c}{2}$$

In some implementations, different components of the global contrast value determination may originate from values of different frequencies (e.g., luminance histogram and RGB thumbnails generated at different frequencies). Given the different timelines of these values, the luminance disparity ($I_d$), the color disparity ($c_d$), and the color contrast ($c_c$) may be interpolated into a common timeline. The common timeline may be selected based on frequencies of the values of the luminance disparity ($I_d$), the color disparity ($c_d$), and the color contrast ($c_c$) and/or other information.

Figure 6A:
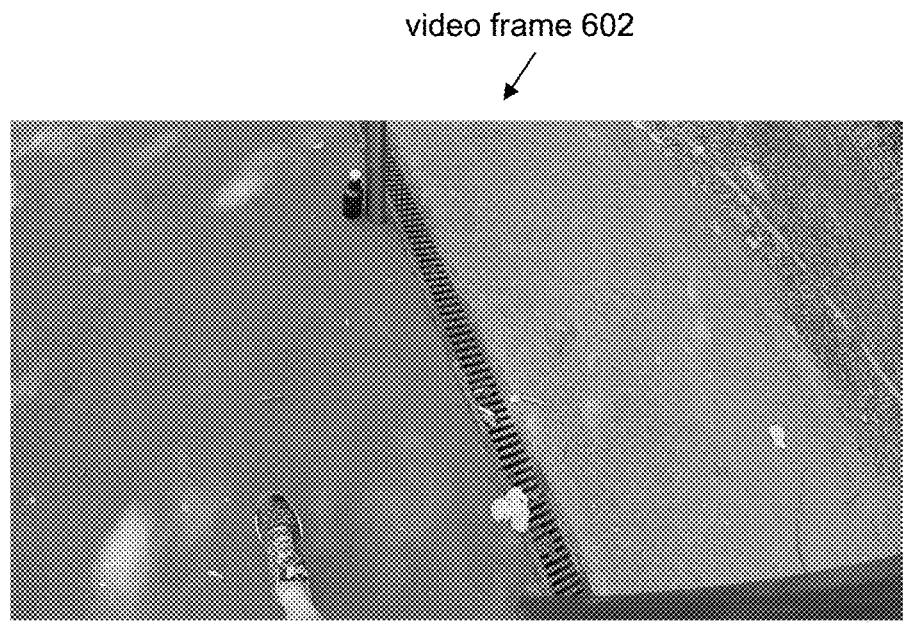
FIG. 6A illustrates example images evaluated using a uniformity metric.
Figure 6A:
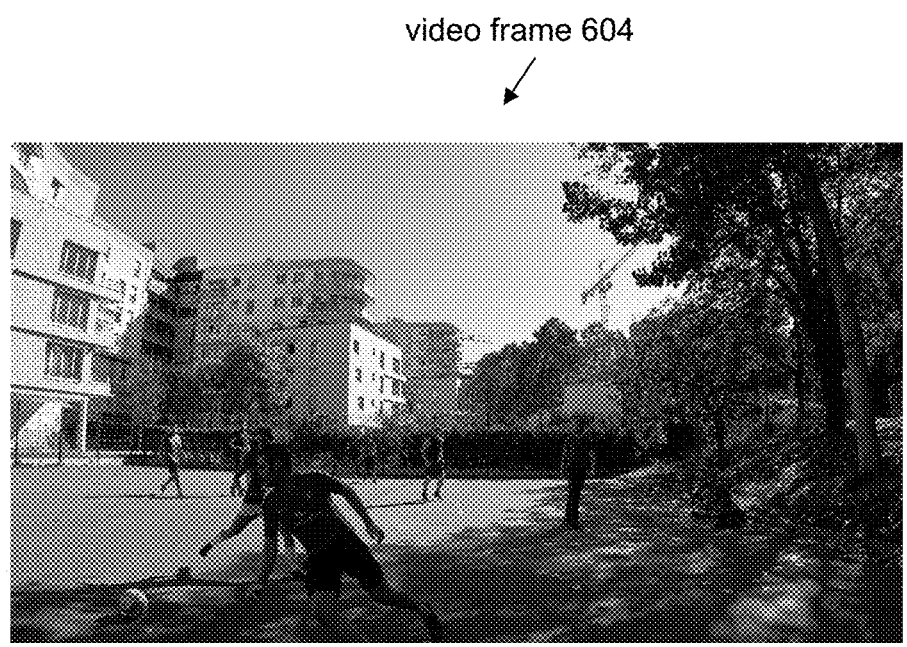

The uniformity metric may refer to a metric that measures the content of a video frame based on uniformity of visual content of the video frame. The uniformity metric may characterize uniformity of the visual content. The value of the uniformity metric may depend on the extent to which the visual content of the video frame mainly includes one color and/or has poor local gradient magnitude. The value of the uniformity metric may be low/minimized if the visual content within the video frame is uniform (e.g., images of floor, ground or sky, badly contrasted images), and high/maximized if the visual content within the video frame is not uniform (or vice versa). For example, referring to FIG. 6A, the value of the uniformity metric for the video frame 602 may be lower than the value of the uniform uniformity for the video frame 604 (or vice versa), and indicate that the visual content of the video frame 604 is less uniform than the visual content than the video frame 602.

A value of the uniformity metric for a video frame may be determined based on computation of cumulative histograms and entropy of histograms of the hue channel and the local minimum/maximum ratio image. In some implementations, the value of the uniformity metric for a video frame may be determined based data provided by an image capture device (e.g., in a binary dump). In some implementations, the value of the uniformity metric for a video frame may be determined using one or more weighted masks. A weighted mask may give different importance to uniformity of different portions within the video frame. For example, a weighted mask may give more weight to center part of the video frame than other parts of the video frame (e.g., increase weights for pixels in the center of the video frame and decrease weights for pixels close to the borders) to account for the likelihood that a person may pay more attention to the center of the video frame than its border. A weighted mask may be obtained by computing a two-dimensional Gaussian mask. Additionally, color information may be used with luminance information to discriminate video frames with different number of histogram modes, and/or entropy may be computed to further improve the quality of the uniformity metric.

The value of the uniformity metric for a video frame may be determined based on fiber value of the median over a cumulative sum of a luminance gradient histogram, fiber value of the median over a cumulative sum of a hue histogram, an entropy of a luminance histogram, an entropy of the hue histogram, and/or other pixel characteristics of the video frame. The entropy may provide information on the distribution of the histogram. For uniform video frames, the entropy may be low. For non-uniform video frames, the entropy may be high (e.g., flat histogram). The fiber values of the cumulative histogram may provide the same or similar type of information. For uniform video frames, the gradients may be low and most of the values may be concentrated in the first bins (that represent low values of gradients). In terms of colors, uniform video frames may have mainly one mode, which may be detected using the same approach.

To determine the value of the uniformity metric for a video frame, the luminance channel may be computed over red, green, and blue channels as:

$$L = 0.299R + 0.587G + 0.114B$$

A gradient image may be computed as a ratio of the minimum and maximum value of a 3×3 neighborhood around a pixel:

$$G(i, j) = \frac{\min\{G(i+m, j+n)_{m \in [-1,0,1], n \in [-1,0,1]}\}}{\max\{G(i+m, j+n)_{m \in [-1,0,1], n \in [-1,0,1]}\}}$$

Figure 6B:
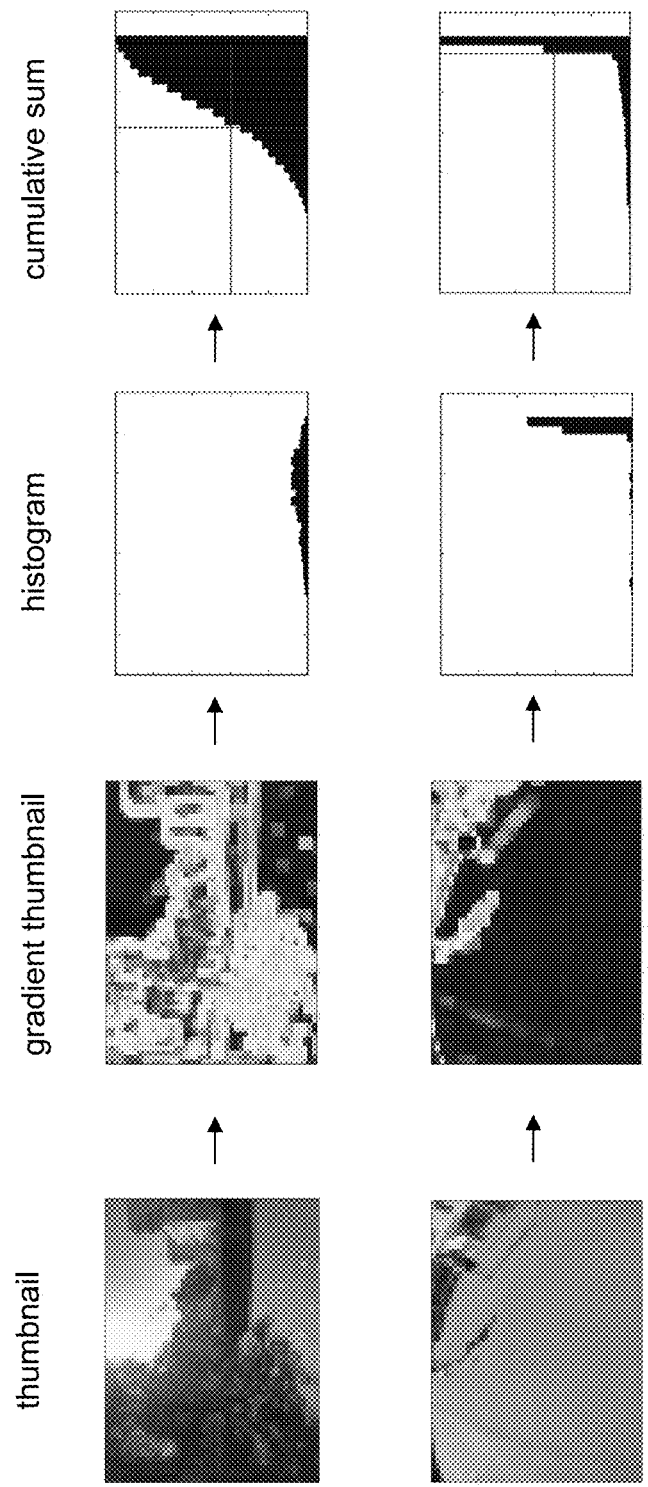
FIG. 6B illustrates example thumbnails, gradient thumbnails, histograms, and cumulative sums.

Histogram may then be computed over the gradient image (gradient thumbnail). The number of bins may be set to 32 and the range may be limited between [0, 1]. This may result in all video frames (thumbnails) being represented in a common space. The histogram may then be normalized by the sum of the weighted mask (e.g., Gaussian mask) in order to have tis sum equal to 1.0. The cumulative sum may then be computed over the normalized histogram to produce the cumulative histogram. Example thumbnails, gradient thumbnails, histograms, and cumulative sums are shown in FIG. 6B.

A cumulative histogram may separate video frames that are flat (e.g., mainly flat) from video frames that are textured (e.g., heavily textured). A flat video frame have a minimum/maximum ratio close to 1.0, while a textured video frame may have a small minimum/maximum ratio. On the cumulative histograms, the median fiber (from which bin half of the pixels have been classified) may separate uniform video frames from flat video frames. Higher fiber may indicate more uniform video frame.

Entropy of the cumulative histogram may provide another way of separating uniform video frames from flat video frames. The entropy (E(H)) may be computed as following, where H is a normalized histogram and N is its number of bins, and higher entropy indicates more textured video frame:

$$E(H) = -\sum_{0 \le i \le N-1} H(i) \log(H(i))$$

To obtain a normalized entropy value (stretched between [0, 1]), minimum and maximum achievable values and computed. The maximum achievable entropy value ($E_{max}$) is computed when the histogram is flat and the minimum achievable entropy value ($E_{min}$) is set as when one bin contains 90% of the data and the other bins contain 10% of the data:

$$E_{max} = -\sum_{0 \le i \le N-1} \frac{1}{N} \log\left(\frac{1}{N}\right) = \log(N)$$

$$E_{min} = -0.9\log(0.9) - \sum_{1 \le i \le N-1} \frac{0.1}{N-1} \log(0.1) =$$

$$-0.9\log(0.9) - 0.1\log\left(\frac{0.1}{N-1}\right) \simeq 0.668$$

The entropy of the histogram may be normalized as:

$$E(H) = \frac{E(H) - E_{min}}{E_{max} - E_{min}}$$

Figure 6C:
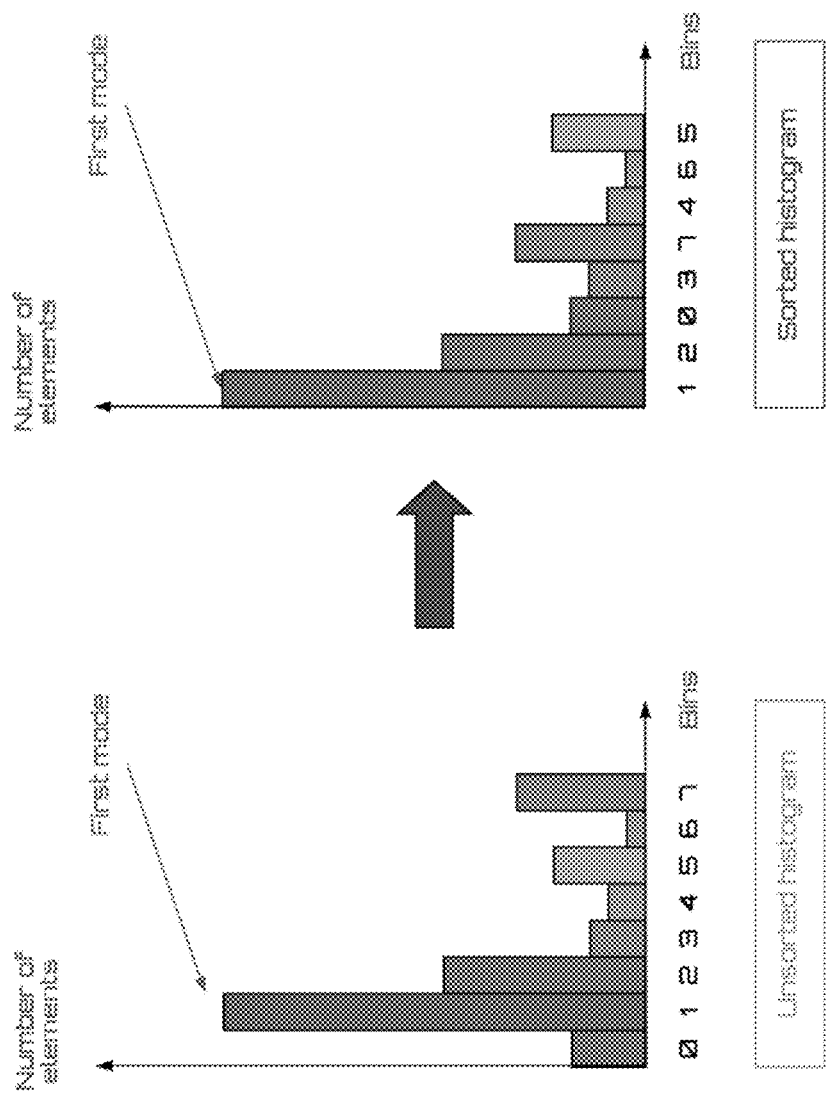
FIG. 6C illustrates example unsorted histogram and sorted histogram.

The hue histogram may be computer over 32 bit and may be weighted by the weighted mask. The hue histogram may be ranged in [0, 1] and normalized. Rather than simply computing the cumulative sum of the histogram, the hue histogram may be sorted around the first mode (the highest bin in the histogram). The sorting may follow the following two rules: (1) sorting is performed based on distance between a given bin and the highest bin, and (2) the distance is circular and the closest bins to the first (index-0) bin are the second bin (index-1) and the last bin (index=N-1). An example of unsorted and sorted histogram are illustrated in FIG. 6C. The cumulative sum may be computed on the sorted histogram to the cumulative histogram, similar to the luminance histogram.

The fiber value for the hue may be computed using the approach for computing the fiber values of the luminance cumulative histogram. However, lower fiber value for the hue may indicate more uniform colors within the video frame. Histogram entropy for hue may be computed using the approach for computing the luminance histogram entropy.

A value of the uniformity metric for a video frame may be determined as a combination of (1) $F_f$—fiber of the cumulative histogram of the luminance gradient video frame (higher the value, more uniform the image), (2) $F_h$—fiber of the cumulative sorted histogram of the hue channel (lower the value, more uniform the image), (3) $E_l$—entropy of the histogram of the luminance gradient image (lower the value, more uniform the image), and (4) $E_h$—entropy of the histogram of the hue channel (lower the value, more uniform the image). The four values may range between [0, 1], and the value of the uniformity metric may be computed as follows, where $\tau_{min}$ (empirically set at 0.5), $\tau_{max}$ (empirically set at 0.9), and threshold stretch the value between [0, 1]

$$\frac{((1-F_l)F_j E_l E_h)^{\frac{1}{4}} - \tau_{min}}{\tau_{max} - \tau_{min}}$$

The use of four different uniformity sub-metric values ($F_l$, $F_h$, $E_l$, $E_h$) provide multiple analysis to accurately detect uniform/non-uniform video frames. For example, even if one of the sub-metric value fails to accurately classify a video frame as being uniform or non-uniform, other three sub-metric values may accurately classify the video frame, and the value of the uniformity metric may accurately indicate whether the video frame is uniform or non-uniform.

In some implementations, use of the hue channel may be replaced with other channel(s). For example, the hue channel may not discriminate well between certain colors, such as blue sky and grey ground/walls. Thus, the hue cumulative histogram may see a video frame including blue sky and grey ground/walls as being uniform. To account for this, a different color space transform that better discriminates one or more colors than the hue channel may be used and/or the analysis may be performed within the RGB color space.

The multiple content metrics may other content metrics, such as a sharpness metric, a subject metric, or an image capture device metric. The sharpness metric may refer to a metric that measures the content of a video frame based on sharpness of visual content of the video frame. The contrast metric may characterize sharpness of the visual content. The value of the contrast metric may depend on the extent to which the visual content of the video frame are sharp versus blurry and/or other information. The value of the sharpness metric may be computed using a video frame at full resolution and/or lower resolution. The sharpness metric may be thresholded by a level of noise within the video frame.

The subject metric may refer to a metric that measure the content of a video frame based on subjects (e.g., persons, things) captured within the visual content of the video frame. The subject metric may characterize inclusion of subjects within the visual content. The value of the subject metric may depend on inclusion of one or more subjects within the visual content, the number of subjects within the visual content, characteristics of one or more subjects within the visual content, and/or other information. For example, the value of the subject metric may indicate or characterize, per video frame, a number of faces within the visual content, an area of the largest region of interest detected among all faces, a maximum emotion score (indicating presence/probability of emotion, such as smiling, cheering, crying) for the detected faces, and/or the size and position of the biggest detected face.

The image capture device metric may refer to a metric that measures the content of a video frame based on how the video frame was captured by an image capture device. The image capture device metric may characterize operation of the image capture device during capture of the video frame. The value of the image capture device metric may depend on the extent to which the visual content of the video frame was captured by an image capture device in or from a good position. For example, the value of the image capture device metric for a video frame that is captured by an image capture device that is pointed towards the ground or the sky may be lower than the value of the image capture device metric for a video frame that is captured by an image capture device that is leveled. The value of the image capture device metric for a video frame that is captured by an image capture device that is moving and/or accelerating may be lower than the value of the image capture device metric for a video frame that is captured by an image capture device that is not moving/not moving as much and/or not accelerating/not accelerating as much. Faster motion of the image capture device may be indicative of the presence of motion blur within the visual content.

In some implementations, different combinations and/or weights of content metrics may be used based on scene classification. Scene classification may refer to classification of scene captured within the video frame. Scene classification may provide context of the visual content. For example, scene classification may be used to differentiate between video frames captured in an urban setting, a beach setting, a snow setting, and/or an underwater setting. For video frames captured in an urban setting, the three-bands metric may not be used. For video frames captured in a beach setting, the three-bands metric may have more weight. For video frames captured in a snow setting, the three-bands metric may have less weight. For video frames captured in an underwater setting, the tree-bands metric and the contrast metric may have less weight. Other combinations and weighting of content metrics are contemplated.

The score component 106 may be configured to determine a score for the individual video frames based on the values of one or more content metrics of the individual video frames and/or other information. A score for a video frame may be determined as a combination of two or more values of different content metrics. For example, a score ($M_{IQ}$) for a video frame may be computed as follows, where $M_{tbm}$ is the value of the three-bands metric, $M_{gcm}$ is the value of the contrast metric, $M_{uni}$ is the value of the uniformity metric, and $M_{shr}$ is the value of the sharpness metric (clipped between [5, 15]. Other computations of scores for video frames are contemplated.

$$M_{IQ} = \left(\frac{1}{2}(M_{tbm} + M_{gmc})^{1/\alpha}(1-M_{uni})^{1/\beta}\left(\frac{M_{shr}-5}{10}\right)^{1/\gamma}\right),$$

with $\alpha, \beta, \gamma > 1$

The scores of the video frames, as a function of progress through the progress length of the video content, may form a score line. For example, the score line may include a curve, with the values of the curve corresponding to a combination of values of multiple content metrics of the individual video frames.

In some implementations, the score for the individual video frames may be determined based on combination of the values of the multiple content metrics along a common progress line and/or other information. A common progress line may refer to a progress line with values of multiple content metrics being determined for the same point/moment in time. The common progress line may be selected based on frequencies of the values of the multiple content metrics and/or other information.

For example, when values of the multiple content metrics are determined, the values may need to be converted/interpolated over the same common progress line (e.g., common timeline). A progress line of the content metrics values with more values may be selected as the common progress line. That is, the progress line with the highest acquisition frequency for underlying values (e.g., different acquisition frequencies for RGB channels, uniformity score, subject detection) of the content metrics values may be selected as the common progress line. The values of the content metrics may be interpolated to the selected common progress line. For every timestamp/frame number of the common progress line, a value per content metric may be obtained (e.g., by linear interpolation).

The identification component 108 may be configured to identify one or more portions of the video content from which video frames may be selected. The identified portion(s) of the video content may include a threshold number of consecutive video frames that meet a score threshold and/or other information. The identified portion(s) of the video content may cover a threshold duration of time during which video frames meet a score threshold and/or other information. A score threshold may form a score threshold line. A score threshold line may include one or more of straight (horizontal, vertical, sloped) portions and/or curved portions. The scores of the video frames (the score line) may be compared with the score threshold (the score threshold line) to determine which of the video frames meet the score threshold (e.g., same as and/or higher than the score threshold, same as or lower than the score threshold). In some implementations, the sharpness (values of the sharpness metric) of the video frames (forming a sharpness line) may be used in selection of the video frames.

Figure 7:
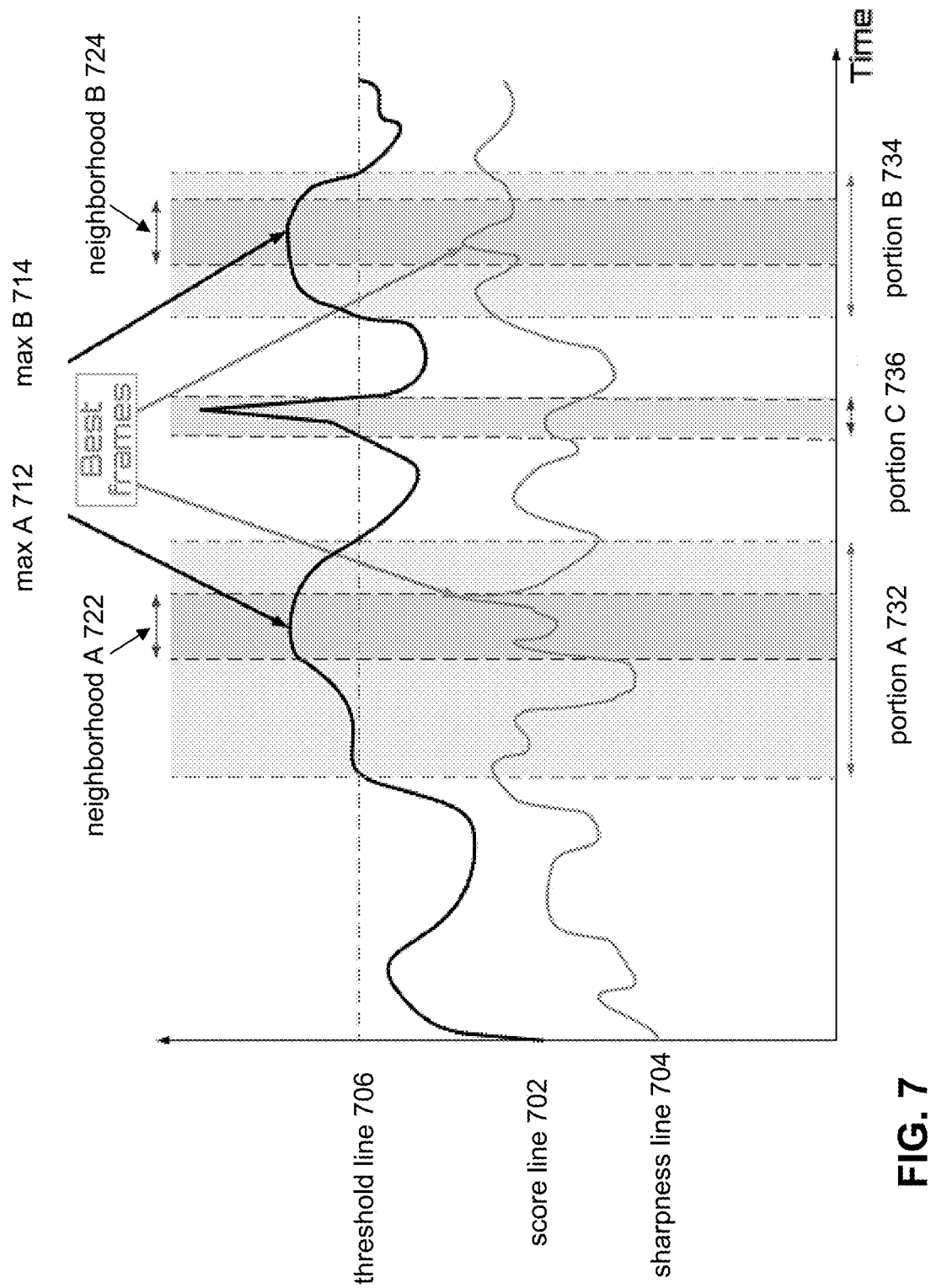
FIG. 7 illustrates an example score line, identification of video portions, and selection of video frames.

FIG. 7 illustrates examples of a score line 702, a sharpness line 704, and a threshold line 706 for video frames (images) of video content captured during a time duration. The identification component 108 may identify the portion(s) of the video content from which video frames may be selected. The identified portion(s) of the video content may include a portion A 732 and a portion B 734, which may include the same or more than a threshold number of consecutive video frames (e.g., 30 video frames) that meet a score threshold. For example, the portion A 732 and the portion B 734 may include the same or more than a threshold number of consecutive video frames that have a score that is the same as and/or higher than the threshold line 706. The portion A 732 and the portion B 734 may cover the same or more than a threshold duration of time during which video frames have a score that is the same as and/or higher than the threshold line 706.

A portion C 736 of the video content may not be to identified as a portion of the video content from which video frames may be selected. The portion C 736 may not include the same or more than a threshold number of consecutive video frames that have a score that is the same as and/or higher than the threshold line 706. The portion C 736 may not cover the same or more than a threshold duration of time during which video frames have a score that is the same as and/or higher than the threshold line 706. That is, while the portion C 736 include video frames with scores (indicated by the score line 702) that is above the threshold line 706, the number of video frames within the portion C 736 and/or the duration of time covered by the portion C 736 may be too short (not meet the threshold number of consecutive video frames, not cover the threshold duration).

Exclusion of such a "short" portion of the video content may simulate smoothing of the score line 702 and provide for more accurate selection of video frames. A short spike (in terms of time duration covered and/or the number of video frames) in the value of the score may be a noise in the score calculation, and may not be truly indicative of the content of the video frame(s) corresponding to the spike. Rather than smooth the score line 702 (which may require generation of the entire score line 702), the width (time duration, number of video frames) of the video portions may be taken into account to remove the "short" portions with scores above the score line 702 from selection of video frames. Such removal of "short" portions may be performed on the fly (while the video frames are being captured and scores determined).

The selection component 110 may be configured to, for individual ones of the one or more portions of the video content, select one or more video frames as one or more exemplar images based on a maximum of the score line within the individual ones of the one or more portions of the video content and/or other information. A maximum of the score line within a portion of the video content may refer to a global maximum within the portion and/or a local maximum within the portion. For example, the selection component 110 may select one or more video frames from a portion of the video content based on the global maximum of the score line within the portion. The selection component 110 may select one or more video frames from a portion of the video content based on one or more local maximum of the score line within the portion. The selected video frame(s) may correspond to or have the value of the global/local maximum or be near a video frame or timestamp with value of the global/local maximum. For example, referring to FIG. 7, the selection component 110 may select one or more video frames at and/or near a max A 712 for the portion A 732, and select one or more video frames at and/or near a max B 714 for the portion B 734.

In some implementations, a video frame may be selected by the selection component 110 as an exemplar image based on sharpness of the visual content defined by the video frame, the video frame being within a threshold number of frames from the maximum of the score line, and/or other information. For example, referring to FIG. 7, based on the max A 712, the sharpness of the video frames within a neighborhood A 722 may be analyzed to select one or more of the video frames. Based on the max B 714, the sharpness of the video frames within a neighborhood B 724 may be analyzed to select one or more of the video frames. For example, the video frame with the highest value of the sharpness line 704 within the neighborhood A 722 may be selected as a "best" frame and the video frame with the highest value of the sharpness line 704 within a neighborhood B 724 may be selected as a "best" frame. The width of the neighborhood A 722 and/or the neighborhood B 724 may be set as a certain number of video frames (e.g., +/−5 video frames) or a certain time duration based on defaults, user input, content identification (e.g., different width based on subjects and/or activities captured within the video frame), and/or other information.

Other values of the content metrics may be used for similar hierarchical selection of video frames. For example, the portions of video content including (1) a threshold number of faces and (2) a threshold number of consecutive video frames (e.g., 5 video frames) may be identified, and one or more video frames may be selected based on a global/local maximum of the number of faces. For instance, for individual maximum, the sharpest video frame within a neighborhood of the maximum (e.g., +/−2 video frames) may be selected. Uses of other content metrics and other hierarchy of content metrics are contemplated.

In some implementations, at least one of the one or more selected video frames may be filtered out as a similar video frame based on similarity to another selected video frame retained as a retained video frame. That is, the video frames selected by the selection component 110 may be analyzed to determine if two or more of the video frames are similar to each other, and similar video frames may be filtered out from the selection/unselected. The similarity analysis of video frames may be performed on full-resolution video frames and/or lower-resolution video frames (e.g., on thumbnails). The similar video frame may be filtered out based on depiction of one or more objects within the similar video frame and the retained video frame and/or other information. For example, a video frame may be filtered out as being similar to another video frame based on the video frame including depiction of one or more objects that are similar to the depiction included within the other video frame. Such filtering of selected video frames may provide diversity of depictions in the selected video frames.

In some implementations, the similarity of video frames may be computed as a similarity score between the video frames. If the similarity score is below a similarity threshold, the video frames may be retained as being sufficiently dissimilar. If the similarity score meets the similarity threshold, one of the video frames may be retained while the other video frame(s) may be removed from the selection.

In some implementations, the similarity score may be computed based on values of one or more similarity metrics. For example, a similarity score for two video frames may be computed based on luminance comparison of the two video frames, contrast comparison of the two video frames, and structure comparison of the two video frames. A similarity score for two video frames may be computed based on division of the video frames into sub-images and computation of 1D-histogram of the pixel values (e.g., 16-bins histograms), where the similarity of the video frames are evaluated based on intersection of the sub-image histograms. A similarity score for two video frames may be computed based on sub-image histograms of colors and variances, where the similarity of the video frames are evaluated based on a combination (e.g., mean) of the intersection of the color histograms and the intersection of the variance histograms. A similarity score for two video frames may be computed based on modeling the video frames/thumbnails of the video frames with a Gaussian mixture model (e.g., with 4 Gaussians using (R, G, B, x, y) pixels of the video frame as input data). A similarity score for two video frames may be computed based on depiction of one or more objects within the video frames. Other computation of similarity scores are contemplated.

The decision on which of the similar video frames are retained may be made based on one or more of the content metrics. For example, if no subjects or faces are detected within the video frames, the video frame with the highest score may be retained while similar video frames with lower score may be removed from selection. If only one video frame includes a depiction of a face, only the video frame including the depiction of the face may be retained while similar video frames without a face may be removed from the selection. If similar video frames include faces, the video frame with the highest score or the highest number of faces may be retained while similar video frames with lower score or lower number of faces may be removed from selection. If similar video frames include faces with different emotion, the video frame including depiction of a particular emotion (e.g., smiling, cheering, crying) may be retained while similar video frames without the particular emotion may be removed from the selection. similar video frames include faces with the same emotion, the video frame including depiction of a larger emotion (e.g., larger smile, larger cheer) may be retained while similar video frames with the smaller emotion may be removed from the selection. Use of other content metrics and/or other combinations of content metrics for similarity filtering are contemplated.

The presentation component 112 may be configured to present one or more selected video frames on one or more displays. Presentation of a selected video frame on a display may include presentation of a full resolution version of the selected video frame or a lower-resolution version of the selected video frame. The selected video frame(s) may be presented as exemplar (e.g., best) image(s) of the video. In some implementations, the selected video frame(s) may be presented as preview of the video. In some implementation, the selected video frame(s) may be presented as one or more links to one or more portions within the progress length of the video. For example, a selected video frame may be presented for user selection, and the user selection of the selected video frame may prompt playback of the video to change (e.g., fast forward, skip, reverse) to the corresponding video frame/moment within the video/progress length.

In some implementations, video frames having low (e.g., worst) scores may be selected and presented as "worst" or "bad" images. Video frames selected as "worst" or "bad" images may be filtered based on similarity. In some implementations, presentation of the selected video frame(s) may include highlighting of the selected video frame(s) during playback of the video. For example, the video may be edited to include a still shot of a selected video frame during playback.

While the present disclosure is described with respect video frames of a video, one or more other implementations of the system may be configured for other types media content. For example, the approaches disclosed herein may be applied to images captured by one or more image capture devices. The images may be captured without generation of the video (e.g., images are not captured as video frames of a video), and the approaches disclosed herein may be used to select one or more images from the captured images. In some implementations, the selected image(s) may be stored within memory while non-selected image(s) may be discarded (e.g., deleted from memory).

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a single location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

In some implementations, spherical video content may be consumed as virtual reality content. Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
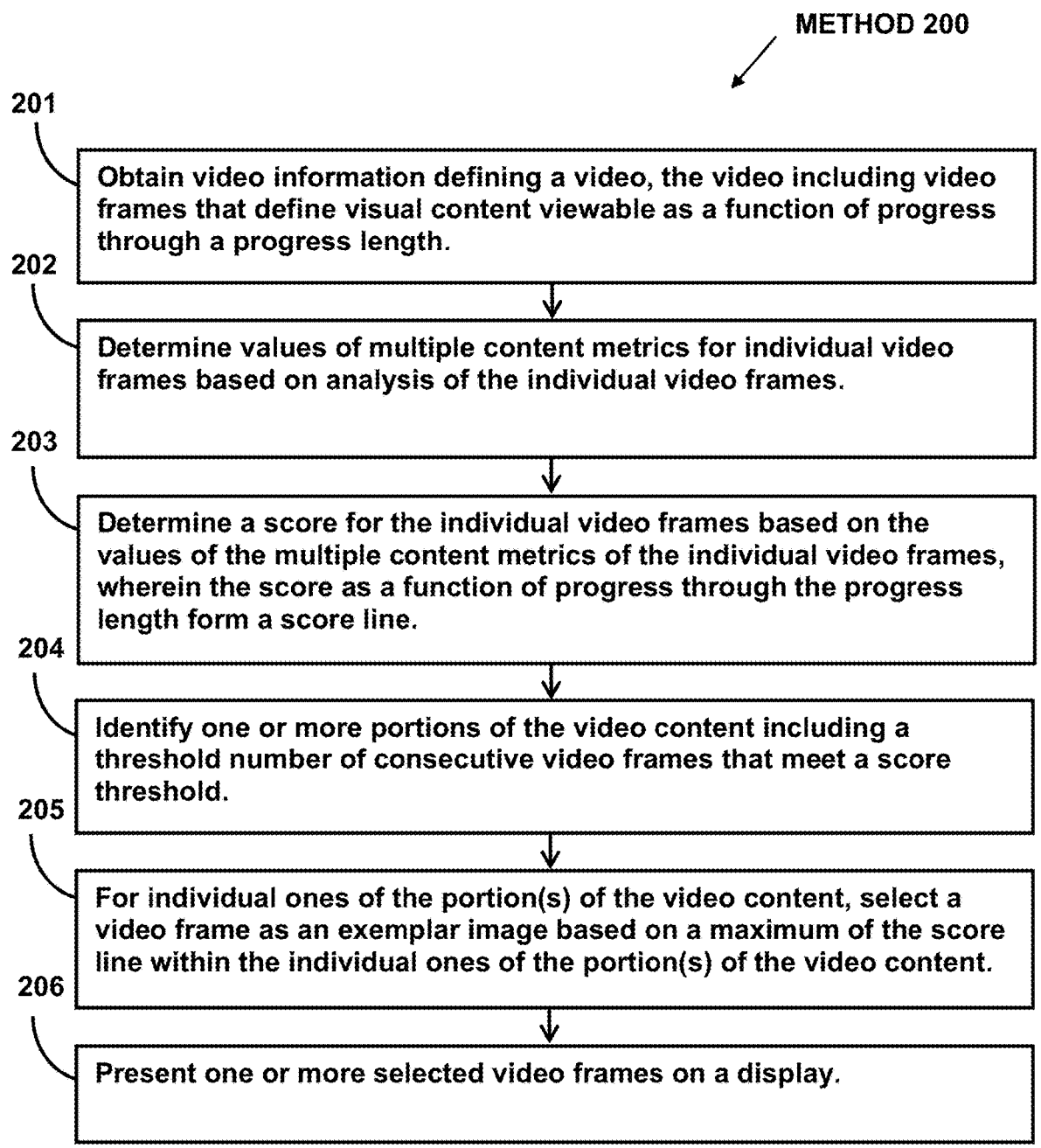
FIG. 2 illustrates a method for selecting images.

FIG. 2 illustrates method 200 for selecting images. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining a video may be obtained. The video may include video content having a progress length. The video content may include video frames that define visual content viewable as a function of progress through the progress length. In some implementation, operation 201 may be performed by a processor component the same as or similar to the video information component 102 (Shown in FIG. 1 and described herein).

At operation 202, values of multiple content metrics for individual video frames may be determined based on analysis of the individual video frames. In some implementations, operation 202 may be performed by a processor component the same as or similar to the metric component 104 (Shown in FIG. 1 and described herein).

At operation 203, a score for the individual video frames may be determined based on the values of the multiple content metrics of the individual video frames. The score as a function of progress through the progress length may form a score line. In some implementations, operation 203 may be performed by a processor component the same as or similar to the score component 106 (Shown in FIG. 1 and described herein).

At operation 204, one or more portions of the video content including a threshold number of consecutive video frames that meet a score threshold may be identified. In some implementations, operation 204 may be performed by a processor component the same as or similar to the identification component 108 (Shown in FIG. 1 and described herein).

At operation 205, for individual ones of the portion(s) of the video content, a video frame may be selected as an exemplar image based on a maximum of the score line within the individual ones of the portion(s) of the video content. In some implementations, operation 205 may be performed by a processor component the same as or similar to the selection component 110 (Shown in FIG. 1 and described herein).

At operation 206, one or more selected video frames may be presented on a display. In some implementations, operation 206 may be performed by a processor component the same as or similar to the presentation component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that selects images, the system comprising: one or more physical processors configured by machine-readable instructions to:

obtain video information defining a video, the video including video content having a progress length, the video content including video frames that define visual content viewable as a function of progress through the progress length;

determine values of multiple content metrics for individual video frames based on analysis of the individual video frames;

determine a score for the individual video frames based on the values of the multiple content metrics of the individual video frames, wherein the score as a function of progress through the progress length form a score line;

identify portions of the video content including consecutive video frames that meet a score threshold, the identified portions of the video content including a first identified portion and a second identified portion, the first identified portion including a first number of consecutive video frames that meet the score threshold and the second identified portion including a second number of consecutive video frames that meet the score threshold, the first number different from the second number;

select one or more of the identified portions that include at least a threshold number of consecutive video frames that meet the score threshold, wherein the first identified potion is selected based on the first number of consecutive video frames that meet the score threshold being more than the threshold number of consecutive video frames and the second identified portion is not selected based on the second number of consecutive video frames that meet the score threshold being fewer than the threshold number of consecutive video frames;

for individual ones of the one or more selected portions of the video content, select a video frame as an exemplar image based on a maximum of the score line within the individual ones of the one or more selected portions of the video content; and present one or more selected video frames on a display.

2. The system of claim 1, wherein the multiple content metrics include two or more of a three-bands metric, a contrast metric, and/or a uniformity metric, the three-bands metric characterizing division of the visual content within a first band, a second band, and a third band, the second band located between the first band and the third band, the contrast metric characterizing a range of colors within the visual content, and the uniformity metric characterizing uniformity of the visual content.

3. The system of claim 2, wherein the multiple content metrics further include a sharpness metric, the sharpness metric characterizing sharpness of the visual content.

4. The system of claim 1, wherein selection of the video frame as the exemplar image based on the maximum of the score line within the individual ones of the one or more selected portions of the video content includes, for a first selected portion of the video content:

determining sharpness values of neighboring video frames of the first selected portion, the neighboring video frames including video frames of the first selected portion within a threshold video frame number of the maximum of the score line within the first selected portion; and selecting a single video frame from the neighboring video frames as the exemplar image based on the single video frame having highest sharpness value among the neighboring video frames.

5. The system of claim 1, wherein the score for the individual video frames is determined based on combination of the values of the multiple content metrics along a common progress line.

6. The system of claim 5, wherein the common progress line is selected based on frequencies of the values of the multiple content metrics.

7. The system of claim 1, wherein at least one of the one or more selected video frames is filtered out as a similar video frame based on similarity to another selected video frame retained as a retained video frame.

8. The system of claim 7, wherein the similar video frame is filtered out further based on depiction of one or more objects within the similar video frame and the retained video frame.

9. The system of claim 1, wherein lower-resolution thumbnails of the video frames are generated for determination of the values of the multiple content metrics.

10. The system of claim 9, wherein the lower-resolution thumbnails include RGB thumbnails, and a color space transform is performed on the RGB thumbnails to obtain HSV thumbnails.

11. A method for selecting images, the method performing by a computing system including one or more processors, the method comprising:

obtaining, by the computing system, video information defining a video, the video including video content having a progress length, the video content including video frames that define visual content viewable as a function of progress through the progress length;

determining, by the computing system, values of multiple content metrics for individual video frames based on analysis of the individual video frames;

determining, by the computing system, a score for the individual video frames based on the values of the multiple content metrics of the individual video frames, wherein the score as a function of progress through the progress length form a score line;

identifying, by the computing system, portions of the video content including consecutive video frames that meet a score threshold, the identified portions of the video content including a first identified portion and a second identified portion, the first identified portion including a first number of consecutive video frames that meet the score threshold and the second identified portion including a second number of consecutive video frames that meet the score threshold, the first number different from the second number;

selecting, by the computing system, one or more of the identified portions that include at least a threshold number of consecutive video frames that meet the score threshold, wherein the first identified potion is selected based on the first number of consecutive video frames that meet the score threshold being more than the threshold number of consecutive video frames and the second identified portion is not selected based on the second number of consecutive video frames that meet the score threshold being fewer than the threshold number of consecutive video frames;

for individual ones of the one or more selected portions of the video content, selecting, by the computing system, a video frame as an exemplar image based on a maximum of the score line within the individual ones of the one or more selected portions of the video content; and presenting, by the computing system, one or more selected video frames on a display.

12. The method of claim 11, wherein the multiple content metrics include two or more of a three-bands metric, a contrast metric, and/or a uniformity metric, the three-bands metric characterizing division of the visual content within a first band, a second band, and a third band, the second band located between the first band and the third band, the contrast metric characterizing a range of colors within the visual content, and the uniformity metric characterizing uniformity of the visual content.

13. The method of claim 12, wherein the multiple content metrics further include a sharpness metric, the sharpness metric characterizing sharpness of the visual content.

14. The method of claim 11, wherein selection of the video frame as the exemplar image based on the maximum of the score line within the individual ones of the one or more selected portions of the video content includes, for a first selected portion of the video content:

determining sharpness values of neighboring video frames of the first selected portion, the neighboring video frames including video frames of the first selected portion within a threshold video frame number of the maximum of the score line within the first selected portion; and selecting a single video frame from the neighboring video frames as the exemplar image based on the single video frame having highest sharpness value among the neighboring video frames.

15. The method of claim 11, wherein the score for the individual video frames is determined based on combination of the values of the multiple content metrics along a common progress line.

16. The method of claim 15, wherein the common progress line is selected based on frequencies of the values of the multiple content metrics.

17. The method of claim 11, wherein at least one of the one or more selected video frames is filtered out as a similar video frame based on similarity to another selected video frame retained as a retained video frame.

18. The method of claim 17, wherein the similar video frame is filtered out further based on depiction of one or more objects within the similar video frame and the retained video frame.

19. The method of claim 11, wherein lower-resolution thumbnails of the video frames are generated for determination of the values of the multiple content metrics.

20. The method of claim 19, wherein the lower-resolution thumbnails include RGB thumbnails, and a color space transform is performed on the RGB thumbnails to obtain HSV thumbnails.

* * * * *